United States Patent
Dornstetter et al.

(10) Patent No.: US 9,871,623 B2
(45) Date of Patent: Jan. 16, 2018

(54) VITERBI DECODING APPARATUS AND VITERBI DECODING METHOD

(71) Applicant: MStar Semiconductor, Inc., Hsinchu Hsien (TW)

(72) Inventors: Jean-Louis Dornstetter, Choisel (FR); Hsin-Chuan Kuo, Zhubei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 0 days.

(21) Appl. No.: 15/153,842

(22) Filed: May 13, 2016

(65) Prior Publication Data
US 2016/0337082 A1  Nov. 17, 2016

(30) Foreign Application Priority Data
May 13, 2015 (TW) .............................. 104115236 A (51) Int. Cl.
*H04B 1/00* (2006.01)
*H04L 1/00* (2006.01)

(52) U.S. Cl.
CPC ............ *H04L 1/0054* (2013.01); *H04L 1/006* (2013.01); *H04L 1/0063* (2013.01)

(58) Field of Classification Search
CPC ...... H04L 1/0054; H04L 1/006; H04L 1/0063
See application file for complete search history.

(56) References Cited

U.S. PATENT DOCUMENTS

| | | | | |
|---|---|---|---|---|
| 5,966,412 A * | 10/1999 | Ramaswamy | ........ | H04L 1/0054 375/261 |
| 2001/0008022 A1* | 7/2001 | Kokuryo | ............... | H03M 13/25 714/786 |
| 2006/0161834 A1* | 7/2006 | Saito | ................. | H03M 13/4146 714/780 |

* cited by examiner

*Primary Examiner* — Wednel Cadeau
(74) *Attorney, Agent, or Firm* — Edell, Shapiro & Finnan, LLC (57) ABSTRACT

A Viterbi decoding apparatus includes a main decoder, a re-encoder, an adjusting module, a secondary decoder and a secondary result generating module. The main decoder performs a Viterbi decoding process on input data to generate a set of main decoded results. The re-encoder performs a convolutional encoding process on the set of main decoded results to generate a set of re-encoded results. The adjusting module adjusts the input data according to the set of re-encoded results to generate adjusted input data corresponding to a predetermined path in a Viterbi trellis diagram. The secondary decoder generates a plurality of symbols according to the adjusted input data. The secondary result generating module generates a set of secondary decoded results according to the plurality of symbols and the set of main decoded results.

8 Claims, 7 Drawing Sheets

VITERBI DECODING APPARATUS AND VITERBI DECODING METHOD

This application claims the benefit of Taiwan application Serial No. 104115236, filed May 13, 2015, the subject matter of which is incorporated herein by reference.

BACKGROUND OF THE INVENTION

Field of the Invention

The invention relates in general to Viterbi decoding technologies, and more particularly to a Viterbi decoding technology capable of providing two types of decoded results.

Description of the Related Art

Concatenated error correction codes currently applied to numerous types of communication systems and signal broadcasting systems enhance the performance of encoded results through combining two or more encoding technologies. A receiver in such system needs to first perform an inner code decoding process, and then perform an outer code decoding process on the inner code decoded result. Taking a Digital Video Broadcasting—Terrestrial (DVB-T) system for example, the receiver needs to decode convolutional encoded data by a Viterbi decoder and then sends the decoded result to a Reed-Solomon decoder. Generally known to one person skilled in the art, a typical Viterbi decoder selects an optimum decoded result from many possible decoded results and provides the selected optimum decoded result to the Reed-Solomon decoder. However, the optimum decoded result identified by the Viterbi decoder may not be correct data (i.e., actual data transmitted by the transmitter). In the above situation, the Reed-Solomon decoder is usually incapable of decoding such packet as the packet contains too many errors. To solve the above issue, in a current approach, the Viterbi decoder is designed to provide more than one decoded result (e.g., simultaneously providing an optimum decoded result and a second optimum decoded result) to the Reed-Solomon decoder. If the Reed-Solomon decoder cannot decode the optimum packet, it may attempt to decode the second optimum decoded result, hence enhancing the probability of successful decoding.

SUMMARY OF THE INVENTION

The invention is directed to a Viterbi decoding apparatus and a Viterbi decoding method that are different from a conventional solution of generating a second optimum decoded result.

According to an embodiment of the present invention, a Viterbi decoding apparatus is provided. The Viterbi decoding apparatus includes a main decoder, a re-encoder, an adjusting module, a secondary decoder and a secondary result generating module. The main decoder performs a Viterbi decoding process on input data to generate a set of main decoded results. The re-encoder performs a convolutional encoding process on the set of main decoded results to generate a set of re-encoded results. The adjusting module adjusts the input data according to the set of re-encoded results to generate adjusted input data corresponding to a predetermined path in a Viterbi trellis diagram. The secondary decoder generates a plurality of symbols according to the adjusted input data. The secondary result generating module generates a set of secondary decoded results according to the plurality of symbols and the set of main decoded results.

According to an embodiment of the present invention, a Viterbi decoding method is provided. A Viterbi decoding process is performed on input data to generate a set of main decoded results. A convolutional encoding process is performed on the set of main decoded results to generate a set of re-encoded results. The input data is adjusted according to the set of re-encoded results to generate adjusted input data corresponding to a predetermined path in a Viterbi trellis diagram. A plurality of symbols are generated according to the adjusted input data. A set of secondary decoded results are generated according to the plurality of symbols and the set of main decoded results.

The above and other aspects of the invention will become better understood with regard to the following detailed description of the preferred but non-limiting embodiments. The following description is made with reference to the accompanying drawings.

It should be noted that, the drawings of the present invention include function block diagrams of multiple function modules related to one another. These drawings are not detailed circuit diagrams, and connection lines therein are for indicating signal flows only. The interactions between the function elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 1:
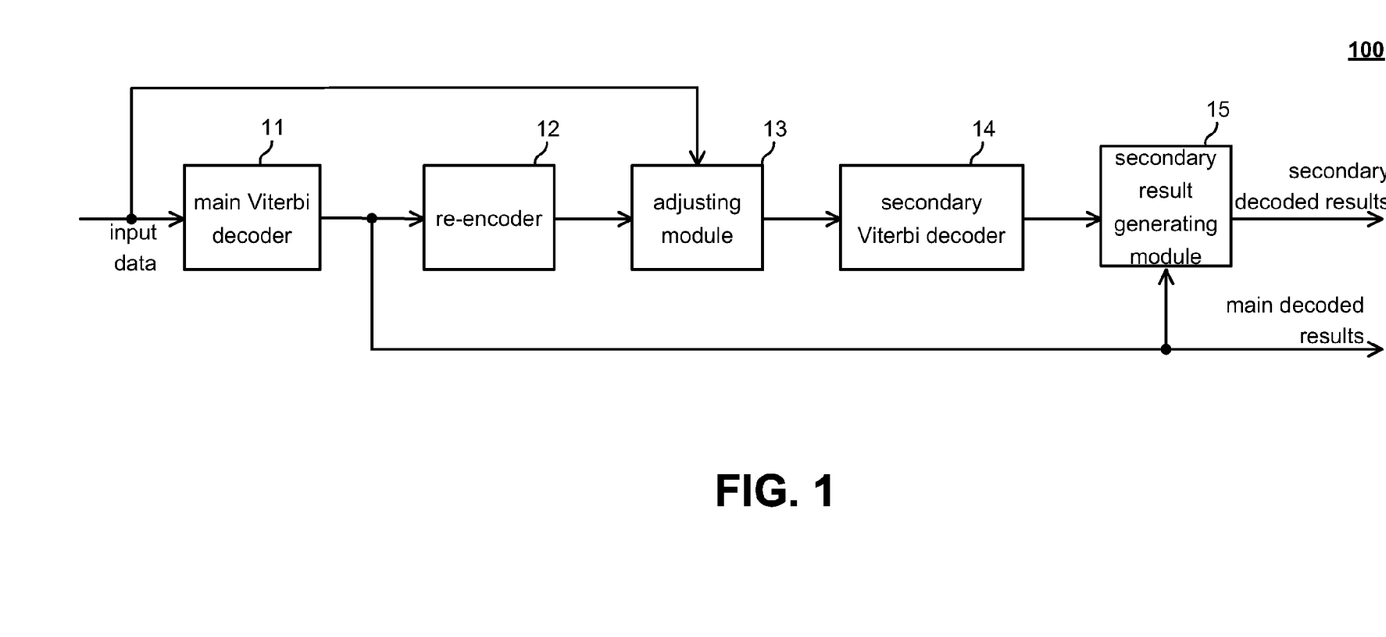
FIG. 1 is a function block diagram of a Viterbi decoding apparatus according to an embodiment of the present invention.

FIG. 1 shows a function block diagram of a Viterbi decoding apparatus 100 according to an embodiment of the present invention. The Viterbi decoding apparatus 100 includes a main Viterbi decoder 11, a re-encoder 12, an adjusting module 13, a secondary Viterbi decoder 14 and a secondary result generating module 15. In practice, the Viterbi decoding apparatus 100 may be integrated in various kinds of electronic systems adopting concatenated error correction codes, or may be an independent unit.

The main Viterbi decoder 11 performs a Viterbi decoding process on its input data, and identifies a decoded result corresponding to an optimum path in a trellis diagram as a set of main decoded results according to the input data. In practice, for example but not limited to, the main Viterbi decoder 11, which may be typical Viterbi decoder, includes a branch metric unit (BMU), a path metric unit (PMU) and a trace-back unit, and selects a series of bits or multiple symbols corresponding to an optimum path in the trellis diagram as decoded results by an add-compare-select process. It should be noted that, details of the typical Viterbi decoding technology are generally known to one person skilled in the art, and shall be omitted herein.

In general, after the process of a Viterbi decoder, a parity bit in original input data is removed, such that a decoded result contains only a data bit associated with actual information. To again obtain information associated with the parity bit, the re-encoder 12 performs a convolutional encoding process on the set of main decoded results generated by the main Viterbi decoder 11 to generate a set of re-encoded results. The function of the re-encoder 12 may be regarded as simulating the task of the transmitter—a set of input data including a parity bit is reconstructed according to the set of main decoded results generated by the Viterbi decoder 11.

Figure 2:
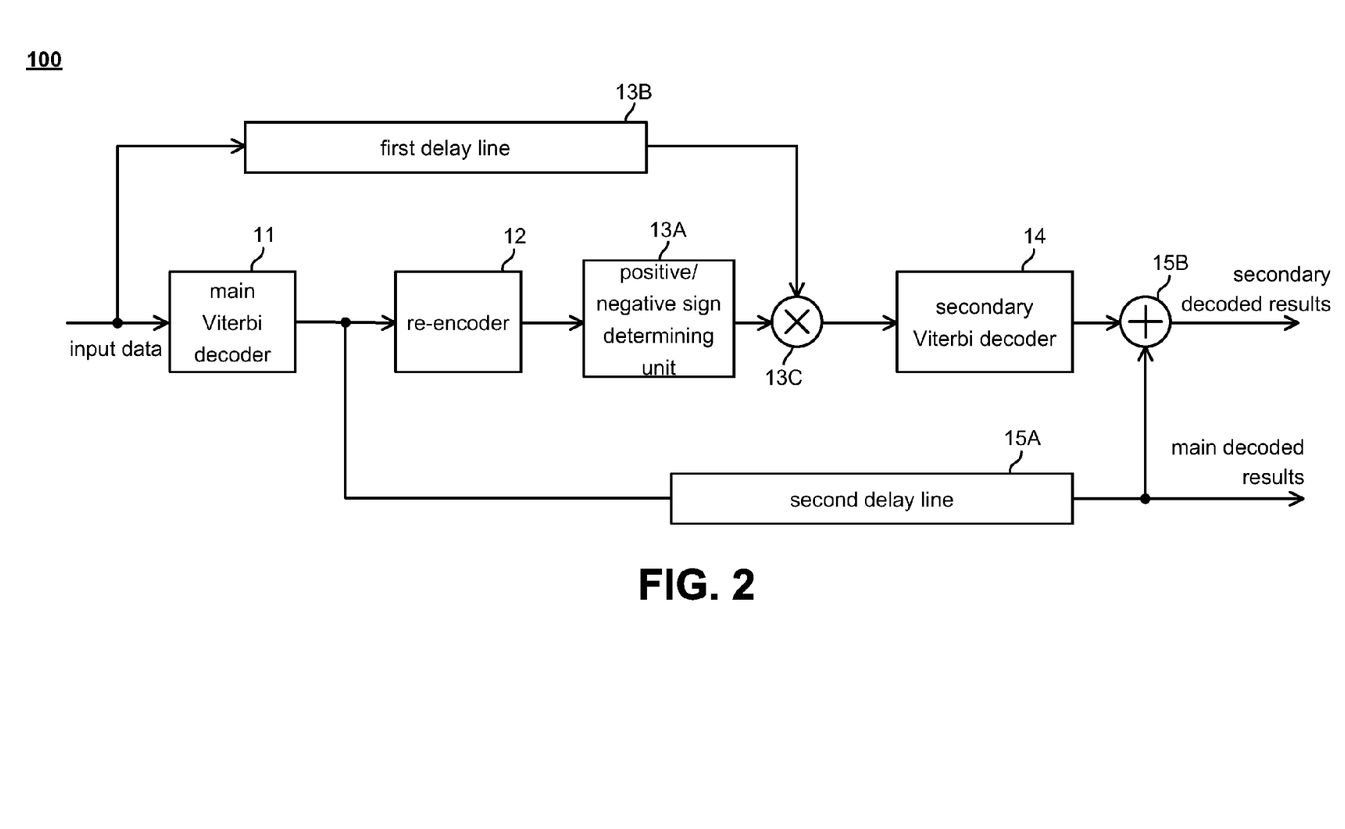
FIG. 2 is a schematic diagram of examples of an adjusting module and a secondary result generating module in a Viterbi decoding apparatus according to an embodiment of the present invention.

The adjusting module 13 adjusts the input data according to the set of re-encoded data generated by the re-encoder 12 to generate adjusted input data that substantially corresponds to a predetermined path in the Viterbi trellis diagram. In one embodiment, the predetermined path is an all-zero path, e.g., a linear path totally corresponding to a node "00" at the top of the trellis diagram in FIG. 4(A). The adjusting module 13 adjusts the input data, such that the main decoded results generated from performing a Viterbi decoding process on the adjusted input data correspond to the all-zero path in the Viterbi trellis diagram. FIG. 2 further shows a detailed example of the adjusting module 13, which is capable of causing the adjusted input data to be substantially corresponding to the all-zero path. Associated operation details are as below.

In the embodiment in FIG. 2, the adjusting module 13 includes a positive/negative sign determining unit 13A, a first delay line 13B and a multiplier 13C. The positive/negative sign determining unit 13A obtains the positive/negative sign of each re-encoded result in the set of re-encoded results. Assuming that a signal provided to the main Viterbi decoder 11 includes N sets of data (where N is an integer greater than 1), the set of the re-encoded results generated by the re-encoder 12 includes N re-encoded results, and the function of the positive/negative sign determining module 13A is to obtain the positive/negative sign of each of the N re-encoded results. As shown in FIG. 2, the first delay line 13B provides a delay amount for the input signal of the main Viterbi decoder 11, and transmits a delayed result that is to be multiplied by the output signal of the positive/negative sign determining unit 13A to the multiplier 13C. The delay amount provided by the first delay line 13B is set to be substantially equal to the total delay caused by the main Viterbi decoder 11, the re-encoder 12 and the positive/negative sign determining module 13A. As such, each set of delayed input signal is multiplied by the positive/negative sign corresponding to the same set of data. That is to say, the multiplier 13C multiples the $i^{th}$ positive/negative sign in the N positive/negative signs by the $i^{th}$ set of data of the input data to generate N sets of adjusted data as the adjusted input data outputted by the adjusting module 13 (where i is an integral index between 1 and N).

Taking the DVB-T standard for example, to transmit signals, the transmitter maps a signal having data contents corresponding to digital logic "0" as a signal having an amplitude "+1", and maps a signal having data contents corresponding to digital logic "1" as a signal having an amplitude "−1". Correspondingly, if the receiver determines that the amplitude of an input signal is positive, this signal is mapped to digital logic "0"; if the receiver determines that the amplitude of an input signal is negative, the signal is mapped to digital logic "1". As previously described, in the adjusting module 13, each set of delayed input signal is multiplied by the positive/negative sign corresponding to the same set of data. When the input signal transmitted to the main Viterbi decoder 11 is completely correct (i.e., identical to the signal outputted by the transmitter), the positive/negative sign of each set of delay signal is consistent with the positive/negative sign obtained by the positive/negative sign determining module 13A, such that the amplitude of each set of adjusted input data outputted by the adjusting module is positive. In the above situation, if a typical Viterbi decoding process is performed on the adjusted input data, the optimum decoded result obtained is all digital logic "0" (corresponding to the all-zero path in the trellis diagram). Through changing the positive/negative sign by which each set of delayed input signal is multiplied using the adjusting module 13, the predetermined path may be altered. With the demonstration of the description below, one person skilled in the art can understand that the scope of the present invention is not limited to the predetermined path being an all-zero path.

The secondary Viterbi decoder 14 performs a non-typical Viterbi decoding process on the adjusted input data outputted by the adjusting module 13. One main difference between the so-called non-typical Viterbi decoding process and a conventional Viterbi process is that, based on the premise that the foregoing predetermined path serves as the optimum path, the secondary Viterbi decoder 14 identifies information associated with another path. In one embodiment, the another path may be a second optimum path. Details of an operation mechanism of the secondary Viterbi decoder 14 are given with reference to the exemplary trellis diagrams in FIG. 4(A) and FIG. 4(B). In the exemplary trellis diagrams, the size of a symbol is 2 bits, the constraint length of a convolutional code is 3, and the code rate is 1/2. The four nodes at the leftmost column (the node N0 in a state 00 and the three nodes below respectively in a state 10, 01 and 11) correspond to two bits $b_0 b_1$ in the first symbol, the four nodes at the second column from the left (the node N1 and the three nodes below) corresponding to a bit $b_1$ in the first symbol and a bit $b_2$ in the second symbol, the four nodes at the third column from the left (the node N2 and the three nodes below) correspond to two bits $b_2 b_3$ in the second symbol, and so forth.

Figure 4A:
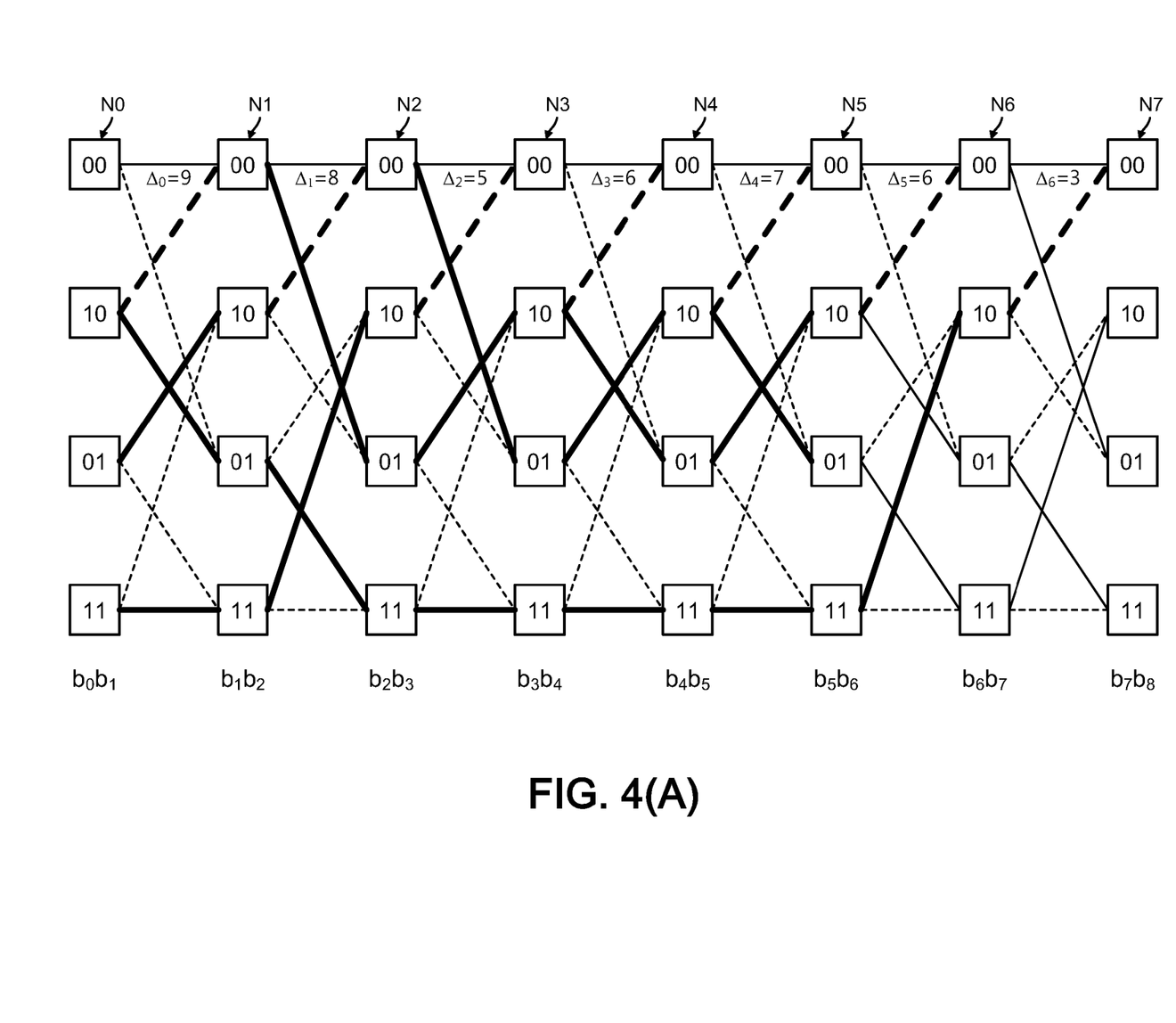
FIG. 4(A) and FIG. 4(B) are examples of a trellis diagram and corresponding decoded results.
Figure 4B:
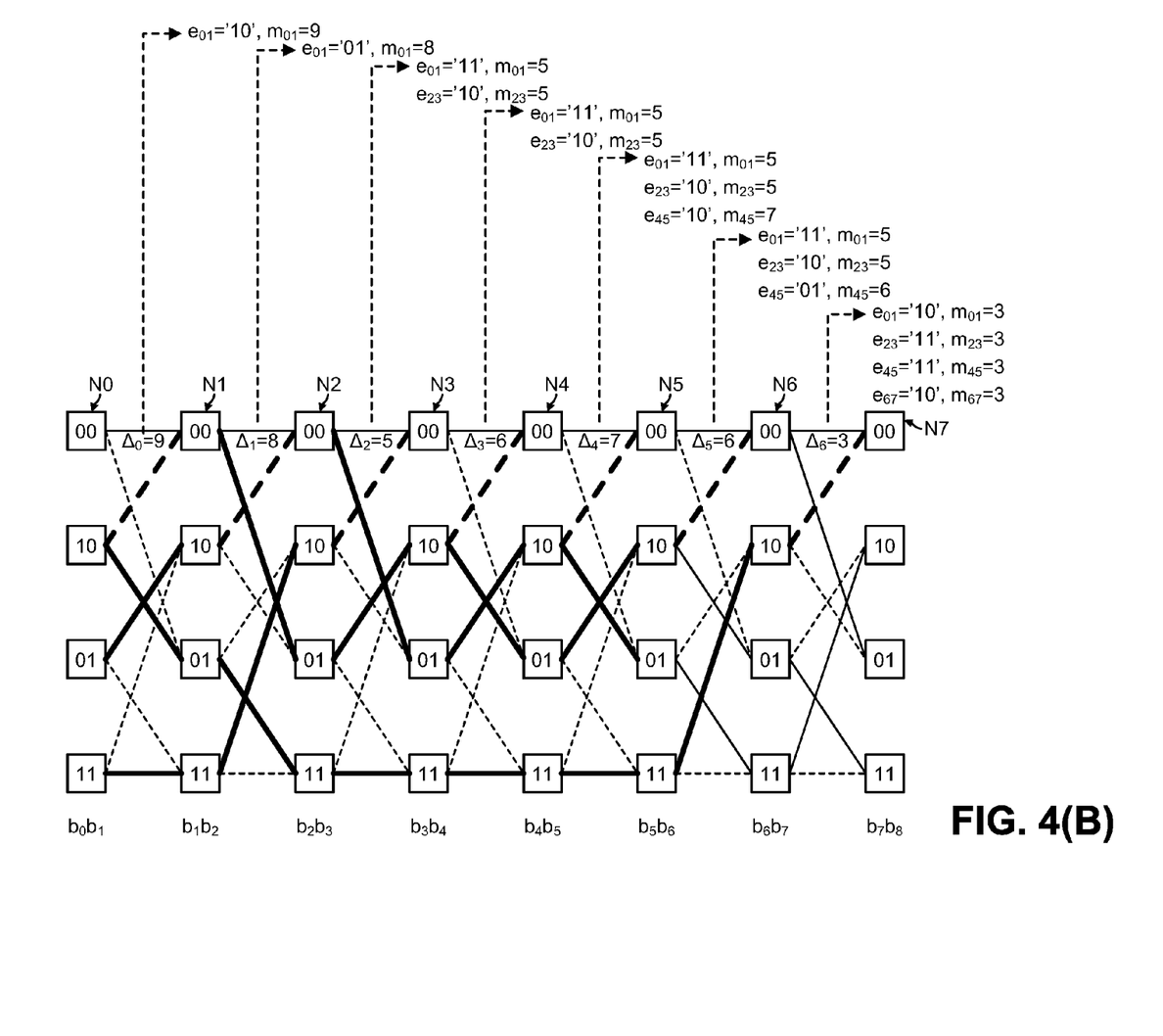

The secondary Viterbi decoder 14 first may identify the metric of each branch in the trellis diagram, and select a survival path (to be referred to as a non-zero survival path), which is traced back from the nodes N1 to N7 of the all-zero path by an add-compare-select process in Viterbi technologies and different from the all-zero path. FIG. 4(A) depicts the attributes of the branches determined by the secondary Viterbi decoder 14. A dotted connecting line represents a lower survival probability of the branch, a solid connecting line represents a high survival probability of the branch, a thin line represents that the branch is totally excluded from all of the considered survival paths, and a solid line represents that the branch is a part of a particular survival path. It is seen from FIG. 4(A) that, the non-zero survival path of the node N1 is $b_0 b_1 b_2 = 100$, the non-zero survival path of the node N2 is $b_0 b_1 b_2 b_3 = 0100$, the non-zero survival path of the node N3 is $b_0 b_1 b_2 b_3 b_4 = 11100$, . . . , and the non-zero survival path of the node N7 is $b_0 b_1 b_2 b_3 b_4 b_5 b_6 b_7 b_8 = 101111100$.

Further, the secondary Viterbi decoder 14 calculates respective accumulated branch metric differences between the non-zero survival path and the all-zero path for the nodes N1 to N7. In one embodiment, a smaller accumulated branch metric difference means that the non-zero survival path is more ideal. In other words, the path having a smaller accumulated branch metric difference is better than a path having a larger accumulated branch metric difference. In the embodiment, the secondary Viterbi decoder 14 respectively calculates 7 accumulated branch metric differences of the nodes N1 to N7, and determines a preferred non-zero survival path from the 7 branch paths. The accumulated metric difference between the non-zero survival path and the all-zero path of the node N1 is 9 (as $\Delta_0=9$ denoted in the diagram), the accumulated metric difference between the non-zero survival path and the all-zero path of the node N2 is 8, . . . , and the accumulated metric difference between the non-zero survival path and the all-zero path of the node N7 is 3.

Figure 3:
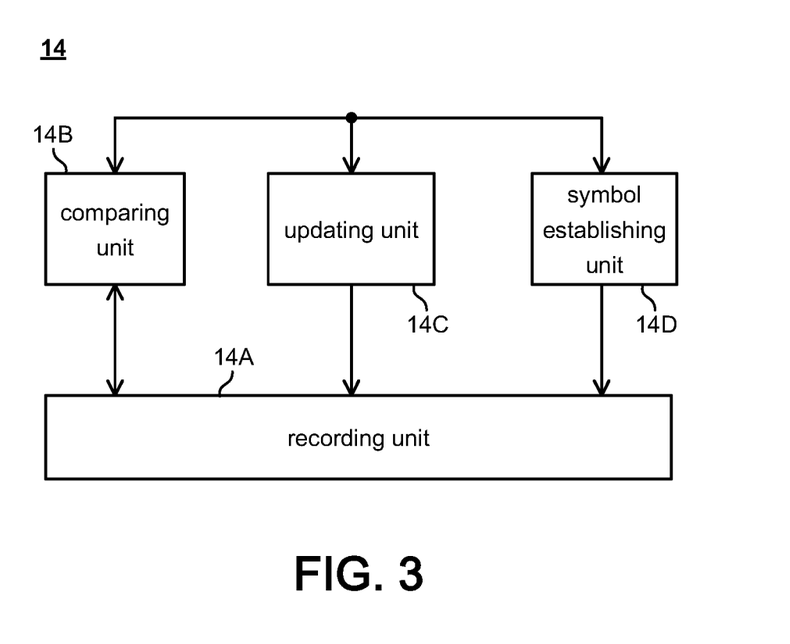
FIG. 3 is a partial diagram of an example of a secondary Viterbi decoder according to an embodiment of the present invention.

FIG. 3 shows a partial diagram of an exemplary secondary Viterbi decoder 14 according to an embodiment of the present invention. The secondary Viterbi decoder 14 includes a recording unit 14A, a comparing unit 14B, an updating unit 14C, and a symbol establishing unit 14D. In brief, the symbol establishing unit 14D sequentially establishes a plurality of symbol records and a metric index corresponding to each of the symbol records. During the decoding process, the updating unit 14C selectively updates the symbol records and the metric indices stored in the recording unit 14A according to a comparison result of the comparing unit 14B. After the operation of the updating unit 14C ends, the symbol records in the recording unit 14A are outputted by the secondary Viterbi decoder 14 to serve as a plurality of symbols used by the secondary result generating module 15. Detailed operations of the circuit units are given below with reference of the exemplary trellis diagram in FIG. 4(B).

The comparing unit 14B sequentially receives the accumulated branch metric differences of the nodes N1 to N7. Each time a latest accumulated branch metric difference is received, the comparing unit 14B compares the latest accumulated branch metric difference with the currently recorded metric index to determine which is better. If the determination result of the comparing unit 14B indicates that the latest accumulated branch metric difference is better than the currently recorded metric index, the updating unit 14C updates the currently recorded symbol record and metric index according to the latest accumulated branch metric difference and the corresponding survival path.

Each time the determination result of the comparing unit 14B indicates that the latest accumulated branch metric difference is not better than the currently recorded metric index, or each time after the updating unit 14C updates the recording unit 14A, the symbol establishing unit 14D determines whether to establish a new set of symbol record and a metric index corresponding to the symbol record in the recording unit 14A. When it is determined that a new set of symbol record and a metric index corresponding to the symbol record are to be established in the recording unit 14A, the symbol establishing unit 14D establishes a new set of symbol record and a metric index corresponding to the symbol record in the recording unit 14A according to the latest accumulated branch metric difference and the corresponding survival path. When the symbol establishing unit 14D determines that a new set of symbol record and a metric index corresponding to the symbol record need not be established in the recording unit 14A, the comparing unit 14B receives another latest accumulated branch metric difference, so as to respectively calculate and compare the branch paths of the nodes.

Referring to FIG. 4(A), the comparing unit 14B first receives the accumulated branch metric difference $\Delta_0=9$ of the node N1. As it is an initial state at this point, the recording unit 14A does not contain any stored metric index, and the comparing unit 14B determines that the recording unit 14A is not recorded with any metric index that is better than the accumulated branch metric index $\Delta_0=9$. Thus, the updating unit 14C updates all of the recorded symbol records and metric indices according to the accumulated branch metric index $\Delta_0=9$ and the corresponding survival path $b_0b_1b_2=100$.

On the other hand, after the updating unit 14C updates the recording unit 14A, the symbol establishing unit 14D determines whether to establish a new set of symbol record and a metric index corresponding to the symbol record. In the embodiment, after the recording unit 14A is selectively updated according to the accumulated branch metric indices of the nodes N1, N3, N5 and N7, the symbol establishing determines that a new set of symbol record and a metric index corresponding to the symbol record are to be established in the recording module 14. Thus, after updating the recording unit 14A according to the accumulated branch metric index $\Delta_0=9$ of the node N1, the symbol establishing unit 14D establishes a new set of symbol record (a first symbol record) and a metric index corresponding to the first symbol record (a first metric index) in the recording unit 14A. According to the accumulated branch metric index $\Delta_0=9$ and the corresponding survival path $b_0b_1b_2=100$, the symbol establishing unit 14D may set the first symbol record $e_{01}=10$ and the first metric index $m_{01}=9$ in the recording unit 14A.

The comparing unit 14B continues to receive the next the accumulated branch metric difference (i.e., the accumulated branch metric difference $\Delta_1=8$) as the latest accumulated branch metric difference, and compares whether the accumulated branch metric difference $A_1=8$ with all of the currently recorded metric indices to determine which is better. As the accumulated branch metric difference $\Delta_1=8$ is better the first metric index $m_{01}=9$ in the recording unit 14A, the updating unit 14C updates all of the symbol records and all of the metric indices currently recorded in the recording unit 14A according to the accumulated branch metric difference $\Delta_1=8$ and the corresponding survival path $b_0b_1b_2b_3=0100$, and updates the first metric index to $m_{01}=8$. Next, the symbol establishing unit 14D determines that a new set of symbol record and a metric index corresponding to the symbol record are not to be established in the recording unit 14A, and so causes the comparing unit 14B to continue receiving the next accumulated branch metric difference (the accumulated branch metric difference $\Delta_2=5$) of the node N3) as the latest accumulated branch metric difference.

Because the accumulated branch metric difference $\Delta_2=5$ is better the first metric index $m_{01}=8$ in the recording unit 14A, the updating unit 14C updates all of the symbol records and all of the metric indices currently recorded in the recording unit 14A according to the accumulated branch metric difference $\Delta_2=5$ and the corresponding survival path $b_0b_1b_2b_3b_4=11100$. Thus, the first symbol record is updated to $e_{01}=11$ according to bits $b_0b_1=11$ in the survival path $b_0b_1b_2b_3b_4=11100$ updates, and the first metric index is updated to $m_{01}=5$. Next, the symbol establishing unit 14D determines that a new set of symbol record (a second symbol record) and a corresponding metric index corresponding to the symbol record (a second metric index) are to be established in the recording unit 14A, and sets the second symbol record $e_{23}=10$ and the second metric index $m_{23}=5$ in the recording unit 14A according to the accumulated branch metric difference $\Delta_2=5$ and the corresponding survival path $b_0b_1 b_2b_3b_4=11100$.

The latest accumulated branch metric difference that the comparing unit 14B next receives is $\Delta_3=6$. Because $\Delta_3=6$ is not better the first metric index $m_{01}=5$ and the second metric index $m_{23}=5$ currently stored in the recording unit 14A, the updating unit 14C does not update the recording unit 14A according to the accumulated branch metric difference $\Delta_3=6$ and the corresponding survival path. On the other hand, as no new symbol record and metric index need be established, the symbol establishing unit 14A does not alter the contents in the recording unit 14A.

The latest accumulated branch metric difference that the comparing unit 14B next receives is $\Delta_4=7$. Because $\Delta_4=7$ is not better the first metric index $m_{01}=5$ and the second metric index $m_{23}=5$ currently stored in the recording unit 14A, the updating unit 14C does not update the recording unit 14A according to the accumulated branch metric difference $\Delta_4=7$ and the corresponding survival path. On the other hand, when a new symbol record (a third symbol record) and a corresponding metric index (a third metric index) are established, the symbol establishing unit 14A sets the third symbol record $e_{45}=10$ and the third metric index $m_{45}=7$ in the recording unit 14A according to the accumulated branch metric difference $\Delta_4=7$ and the survival path $b_0b_1 b_2b_3b_4b_5b_6=0000100$.

Next, because the latest accumulated branch metric difference $\Delta_5=6$ that the comparing unit 14B receives is not better than the first and second metric indices but better than the third metric index $m_{45}=7$ currently recorded in the recording unit 14A, the updating unit 14C establishes all of the metric indices with sequences later than or equal to the third metric index $m_{45}=7$ and all of the symbol records corresponding to these metric indices in the recording unit 14A according to the accumulated branch metric difference $\Delta_4=7$ and the survival path $b_0b_1b_2b_3b_4b_5b_6=0000100$. That is, the updating unit 14C updates the third symbol record to $e_{45}=01$ according to $b_4b_5=01$ in the survival path $b_0b_1b_2b_3b_4b_5b_6=0000100$ and updates the third metric index to $m_{45}=6$.

Next, the latest accumulated branch metric difference $\Delta_6=3$ received by the comparing unit 14B is better than all of the metric indices ($m_{01}$, $m_{23}$, and $m_{45}$) currently recorded in the recording unit 14A. Thus, the updating unit 14C updates all of the symbol records and all of the metric indices currently recorded in the recording unit 14A according to the accumulated branch metric difference $\Delta_6=3$ and the corresponding survival path $b_0b_1b_2b_3b_4b_5b_6b_7b_8=101111100$. That is, the first symbol record is updated to $e_{01}=10$ according to $b_0b_1$ in the survival path $b_0b_1b_2b_3b_4b_5b_6b_7b_8=101111100$, the second symbol record is updated to $e_{23}=11$ according to $b_2b_3$, the third symbol record is updated to $e_{45}=11$ according to $b_4b_5$, and all of the first metric index $m_{01}$, the second metric index $m_{23}$ and the third metric index is updated to $m_{45}$ to 3. Further, as the symbol establishing unit 14D determines that new symbol record and metric index are to be established, the symbol establishing unit 14D sets a fourth symbol record $e_{67}=10$ and a fourth metric index $m_{67}=3$ according to the latest accumulated branch metric difference $\Delta_6=3$ and the corresponding survival path $b_0b_1b_2b_3b_4b_6b_6b_7b_6=101111100$, and so forth. The secondary Viterbi decoder 14 may gradually establish and update multiple sets of symbol records, and output these symbol records after having obtained an appropriate number of symbol records.

In conclusion, the main function of the secondary Viterbi decoder 14 is to select a survival path, which is traced back from each node of a predetermined path and different from the predetermined path, and to calculate an accumulated branch metric difference from the selected survival path and the predetermined path to the node to accordingly determine a plurality of symbols. In the embodiment, a survival path that is traced back from each of the nodes N1 to N7 from the all-zero path and different from the predetermined path is selected as a better and adjusted second optimum survival path.

The secondary result generating module 14 generates a set of secondary decoded results according to the plurality of symbols generated by the secondary Viterbi decoder 14 and the set of main decoded results generated by the main Viterbi decoder 11. As shown in FIG. 2, in one embodiment, the secondary result generating module 15 includes a second delay line 15A and an adder 15B. A delay amount provided by the second delay line 15A is set to be substantially equal to the total delay caused by the four blocks including the re-encoder 12, the positive/negative sign determining unit 13A, the multiplier 13C and the secondary Viterbi decoder 14. As such, each set of delayed main decoded results are added with the symbol corresponding to the same set of data in the adder 15B. As shown in FIG. 1, the main decoded results generated by the main Viterbi decoder 11 and the secondary decoded results generated by the secondary Viterbi decoder 15 are both provided to a subsequent circuit (e.g., a Reed-Solomon decoder) for further use. Through providing two types of decoded results, the performance of a subsequent circuit can be enhanced (e.g., increasing the probability of successful decoding). In one embodiment, the secondary Viterbi decoder 14 of the present invention may be designed to generate more than one set of second optimum symbols that may be respectively combined with the main decoded results, and to provide more than two sets of decoded results to a subsequent circuit based on the required decoding reliability and cost considerations.

In practice, all or a part of the above function modules may be implemented by various control and processing platforms, including fixed and programmable logic circuits, including programmable logic gate arrays, application specific integrated circuits (ASIC), microcontrollers, microprocessors, digital signal processors (DSP), or other necessary circuits.

Further, these function modules may be designed to complete various tasks through executing processor commands stored in a memory (not shown). One person skilled in the art can understand that, there are many types of circuit configuration and elements capable of realizing the concept of the present invention without departing from the spirit of the present invention. Further, the scope of the present invention is not limited to a specific storage mechanism. The recording unit 14A may include one or multiple volatile or non-volatile memory devices, e.g., random access semiconductor memories, read-only memories (ROM), magnetic and/or optical memories, and flash memories.

Figure 5:
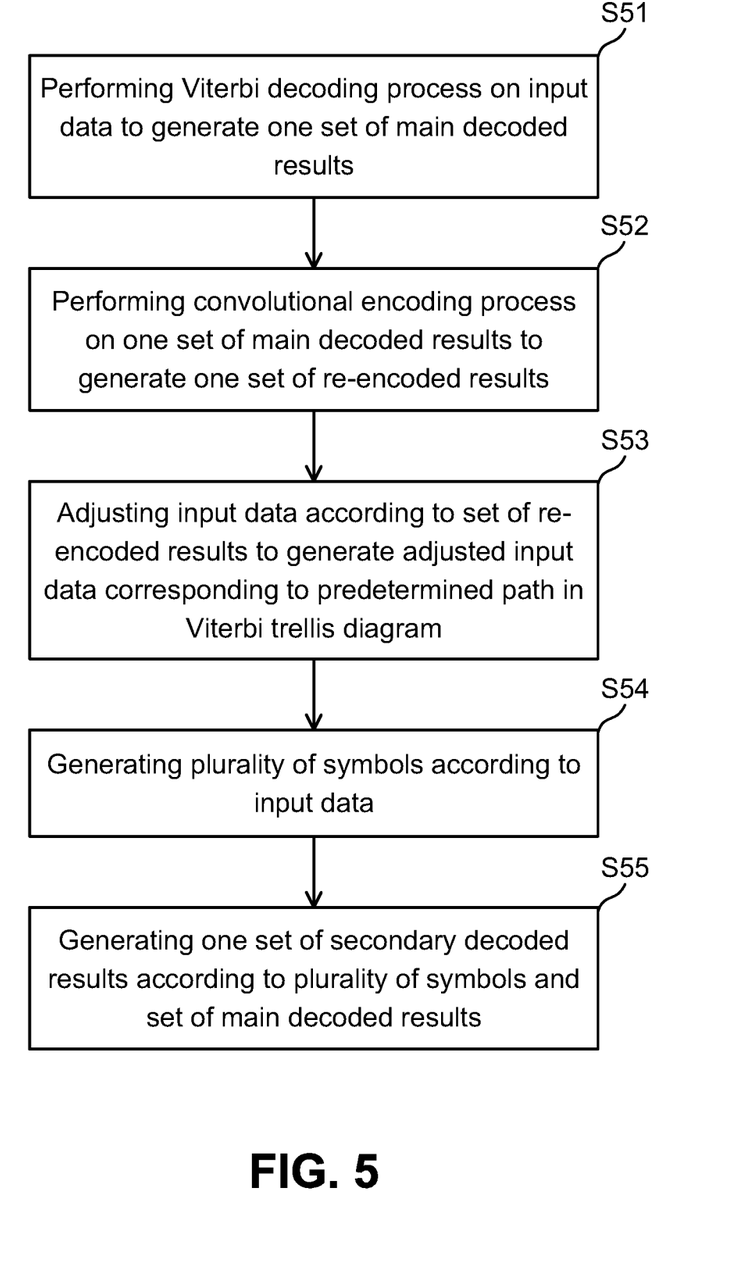
FIG. 5 is a flowchart of a Viterbi decoding process according to an embodiment of the present invention.

FIG. 5 shows a flowchart of a Viterbi decoding method according to another embodiment of the present invention. In step S51, a Viterbi decoding process is performed on input data to generate a set of main decoded results. In step S52, a convolutional encoding process is performed on the set of main decoded results to generate a set of re-encoded results. In step S53, the input data is adjusted according to the set of re-encoded results to generate adjusted input data substantially corresponding to a predetermined path in a Viterbi trellis diagram. In step S54, an add-compare-select process is performed on the adjusted input data according to the Viterbi trellis diagram to select a survival path, which is traced back from a plurality of nodes of the predetermined path and different from the predetermined path, and an accumulated branch metric difference from the selected survival path and the predetermined path to the node is calculated to accordingly determine a plurality of symbols. In step S55, a set of secondary decoded results are generated according to the plurality of symbols and the set of main decoded results.

Figure 6:
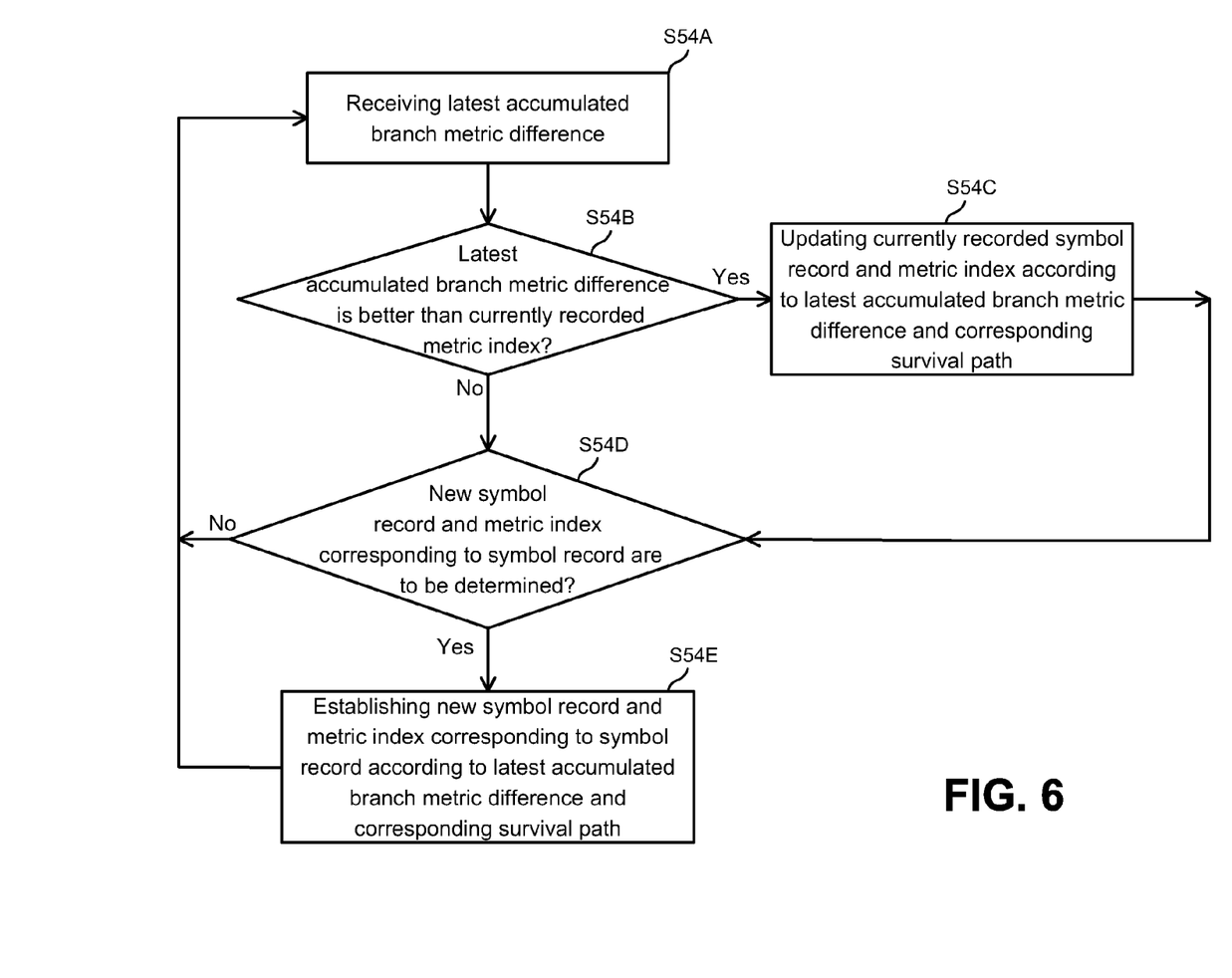
FIG. 6 is a detail partial process of a Viterbi decoding step according to an embodiment of the present invention.

FIG. 6 further shows details of a partial process of step S54. In step S54A, a latest accumulated branch metric difference is received. In step S54B, it is determined whether the latest accumulated branch metric difference is better than a currently recorded metric index. Step S54D is performed when the determination result of step S54B is negative, or else step S54C is performed when the determination result of step S54B is affirmative. In step S54C, a symbol record and a metric index of the currently recorded symbol record are updated according to the latest accumulated branch metric difference and the corresponding survival path. In step S54D, it is determined whether a new set of symbol record and a metric index corresponding to the symbol record are to be established. When the determination result of step S54D is negative, the process returns to step S54A, followed by the subsequent steps. When the determination result of step S54D is affirmative, step S54E is performed, in which a new set of symbol record and a metric index corresponding to the symbol record are established. The process then returns to step S54A.

One person skilled in the art can understand that, orders of certain steps of combination methods of logic determination in FIG. 6 can be equivalent exchange without affecting overall effects of the Viterbi decoding method. Operation variations in the description associated with the Viterbi decoding apparatus 100 may also be applied to the Viterbi decoding method in FIG. 5 and FIG. 6, and shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A Viterbi decoding apparatus, comprising:
a main decoder, performing a Viterbi decoding process on input data to generate a set of main decoded results;
a re-encoder, performing a convolutional encoding process on the set of main decoded results to generate a set of re-encoded results;
an adjusting module adjusting the input data according to the set of re-encoded results to generate adjusted input data corresponding to a predetermined path in a Viterbi trellis diagram;
a secondary decoder, generating a plurality of symbols according to the adjusted input data; and
a secondary result generating module generating a set of secondary decoded results according to the plurality of symbols and the set of main decoded results.

2. The Viterbi decoding apparatus according to claim 1, wherein the secondary decoder selects a survival path, which is traced back from a plurality of nodes of the predetermined path and different from the predetermined path, and for each of the plurality of nodes, calculates an accumulated branch metric difference from the selected survival path and the predetermined path to that node to accordingly generate the plurality of symbols.

3. The Viterbi decoding apparatus according to claim 2, wherein the predetermined path is an all-zero path.

4. The Viterbi decoding apparatus according to claim 2, wherein the secondary decoder comprises:
a recording unit, storing a plurality of symbol records and a metric index corresponding to each of the plurality of symbol records;
a comparing unit, receiving a latest accumulated branch metric difference, and comparing the latest accumulated branch metric difference with a currently recorded metric index in the recording unit;
an updating unit, when a determination result of the comparing unit indicates that the latest accumulated branch metric difference is better than the currently recorded metric index, updating the currently recorded symbol record and metric index according to the latest accumulated branch metric difference and the corresponding survival path; and
a symbol establishing unit, determining whether to establish a new symbol record and a metric index corresponding to the new symbol record; when it is determined that the new symbol record and the metric index corresponding to the new symbol record are to be established, the symbol establishing unit establishing the new symbol record and the metric index corresponding to the new symbol record in the recording unit according to the latest accumulated branch metric difference and the corresponding survival path.

5. The Viterbi decoding apparatus according to claim 3, wherein the input data comprises N sets of data, the set of re-encoded results comprise N re-encoded results, where N is an integer greater than 1, and the adjusting module comprises:
a positive/negative sign determining unit, obtaining N positive/negative signs in the N re-encoded results; and
a multiplier, multiplying an $i^{th}$ positive/negative sign of the N positive/negative signs by an $i^{th}$ set of data of the input data to generate N sets of adjusted data as the adjusted input data, where i is an integral index between 1 and N.

6. A Viterbi decoding method, comprising:
a) performing a Viterbi decoding process on input data to generate a set of main decoded results;
b) performing a convolutional encoding process on the set of main decoded results to generate a set of re-encoded results;
c) adjusting the input data to generate adjusted input data corresponding to a predetermined path in a Viterbi trellis diagram;
d) generating a plurality of symbols according to the adjusted input data; and
e) generating a set of secondary decoded results according to the plurality of symbols and the set of main decoded results
wherein the step of generating the plurality of symbols comprises:
selecting a survival path, which is traced back from a plurality of nodes of the predetermined path and different from the predetermined path, and for each of the plurality of nodes, calculating an accumulated branch metric difference from the selected survival path and the predetermined path to that node to accordingly generate the plurality of symbols, and wherein step (d) comprises:

storing a plurality of symbol records and a metric index corresponding to each of the plurality of symbol records;

receiving a latest accumulated branch metric difference, and comparing the latest accumulated branch metric difference with a currently recorded metric index;

when it is determined that the latest accumulated branch metric difference is better than the currently recorded metric index, updating the currently recorded symbol record and metric index according to the latest accumulated branch metric difference and the corresponding survival path;

determining whether to establish a new symbol record and a metric index corresponding to the symbol record; and when it is determined that the new symbol record and the metric index corresponding to the new symbol record are to be established, establishing the new symbol record and the metric index corresponding to the new symbol record according to the latest accumulated branch metric difference and the corresponding survival path.

7. The Viterbi decoding method according to claim 6, wherein the predetermined path is an all-zero path.

8. The Viterbi decoding method according to claim 7, wherein the input data comprises N sets of data, the set of re-encoded results comprise N re-encoded results, where N is an integer greater than 1, and step (c) comprises:

obtaining N positive/negative signs in the N sets of re-encoded results; and multiplying an $i^{th}$ positive/negative sign of the N positive/negative signs by an $i^{th}$ set of data of the input data to generate N sets of adjusted data as the adjusted input data, where i is an integral index between 1 and N.

* * * * *